(12) United States Patent
Campbell et al.

(10) Patent No.: US 9,444,625 B2
(45) Date of Patent: *Sep. 13, 2016

(54) SYSTEMS AND METHODS FOR AUTHENTICATING AN ELECTRONIC MESSAGE

(71) Applicant: United States Postal Service, Washington, DC (US)

(72) Inventors: Leo J. Campbell, Arlington, VA (US); Jon L. Cook, Alexandria, VA (US); Charles R. Chamberlain, Arlington, VA (US); Michael J. McGrath, Fairfax, VA (US); Isadore Schoen, Burke, VA (US)

(73) Assignee: UNITED STATES POSTAL SERVICE, Washington, DC (US)

( * ) Notice: Subject to any disclaimer, the term of this patent is extended or adjusted under 35 U.S.C. 154(b) by 16 days.

This patent is subject to a terminal disclaimer.

(21) Appl. No.: 13/936,568

(22) Filed: Jul. 8, 2013

(65) Prior Publication Data
US 2013/0297931 A1    Nov. 7, 2013

Related U.S. Application Data

(60) Continuation of application No. 13/333,175, filed on Dec. 21, 2011, now Pat. No. 8,484,479, which is a continuation of application No. 12/457,683, filed on Jun. 18, 2009, now Pat. No. 8,095,797, which is a
(Continued)

(51) Int. Cl.
*H04L 9/32*    (2006.01)
*G07B 17/00*    (2006.01)

(52) U.S. Cl.
CPC ......... *H04L 9/321* (2013.01); *G07B 17/00733* (2013.01); *H04L 9/3247* (2013.01);
(Continued)

(58) Field of Classification Search
CPC ....................................................... H04L 9/3297
USPC .................................................. 713/176, 178
See application file for complete search history.

(56) References Cited

U.S. PATENT DOCUMENTS

| 472,105 A | 4/1892 | Bussard |
| 481,772 A | 8/1892 | Spear |

(Continued)

FOREIGN PATENT DOCUMENTS

| EP | 0 516 898 A1 | 12/1992 |
| JP | 10-124488 | 5/1988 |

(Continued)

OTHER PUBLICATIONS

International Search Report, PCT/US00/27068, mailed Apr. 5, 2001 (4 pages).

(Continued)

*Primary Examiner* — Christopher Brown
(74) *Attorney, Agent, or Firm* — Finnegan, Henderson, Farabow, Garrett & Dunner LLP

(57) ABSTRACT

Systems and methods are disclosed for authenticating electronic messages. A data structure is generated by a computer server which allows for the authentication of the contents and computer server identity of a received electronic message and provides a trusted stamp to authenticate when the message was sent. Data which can authenticate the message, the computer server identity, and the time the message was sent is included into a data structure which is called an Electronic PostMark (EPM).

20 Claims, 17 Drawing Sheets

US 9,444,625 B2

Page 2

Related U.S. Application Data division of application No. 09/675,677, filed on Sep. 29, 2000, now Pat. No. 7,797,543.

(60) Provisional application No. 60/157,168, filed on Sep. 30, 1999, provisional application No. 60/189,983, filed on Mar. 17, 2000.

(52) U.S. Cl.
CPC ... *H04L9/3297* (2013.01); *G07B 2017/00766* (2013.01); *G07B 2017/00798* (2013.01); *G07B 2017/00927* (2013.01); *H04L 2209/56* (2013.01); *H04L 2209/76* (2013.01)

(56) References Cited

U.S. PATENT DOCUMENTS

| | | | |
|---|---|---|---|
| 1,750,339 | A | 3/1930 | Wood |
| 3,229,903 | A | 1/1966 | Smith |
| 4,135,662 | A | 1/1979 | Dlugos |
| 4,309,569 | A | 1/1982 | Merkle |
| 4,574,352 | A | 3/1986 | Coppola et al. |
| 4,725,718 | A | 2/1988 | Sansone et al. |
| 4,727,368 | A | 2/1988 | Larson et al. |
| 4,816,824 | A | 3/1989 | Katz et al. |
| 5,043,908 | A | 8/1991 | Manduley et al. |
| 5,136,646 | A | 8/1992 | Haber et al. |
| 5,136,647 | A | 8/1992 | Haber et al. |
| 5,223,829 | A | 6/1993 | Watabe |
| 5,227,778 | A | 7/1993 | Vacon et al. |
| 5,341,505 | A | 8/1994 | Whitehouse |
| 5,373,561 | A | 12/1994 | Haber et al. |
| 5,377,354 | A | 12/1994 | Scannell et al. |
| 5,387,783 | A | 2/1995 | Mihm et al. |
| 5,404,231 | A | 4/1995 | Bloomfield |
| RE34,954 | E | 5/1995 | Haber et al. |
| 5,481,464 | A | 1/1996 | Ramsden |
| 5,490,077 | A | 2/1996 | Freytag |
| 5,573,178 | A | 11/1996 | Worden |
| 5,619,648 | A | 4/1997 | Canale et al. |
| 5,631,827 | A | 5/1997 | Nicholls et al. |
| 5,638,446 | A * | 6/1997 | Rubin ............... 705/51 |
| 5,648,916 | A | 7/1997 | Manduley et al. |
| 5,701,770 | A | 12/1997 | Cook et al. |
| 5,703,951 | A | 12/1997 | Dolphin |
| 5,710,887 | A | 1/1998 | Chelliah et al. |
| 5,729,594 | A | 3/1998 | Klingman |
| 5,742,829 | A | 4/1998 | Davis et al. |
| 5,752,059 | A | 5/1998 | Holleran et al. |
| 5,774,053 | A | 6/1998 | Porter |
| 5,774,086 | A | 6/1998 | Guyot |
| 5,781,629 | A | 7/1998 | Haber et al. |
| 5,796,841 | A | 8/1998 | Cordery et al. |
| 5,805,810 | A | 9/1998 | Maxwell |
| 5,819,240 | A | 10/1998 | Kara |
| 5,835,087 | A | 11/1998 | Herz et al. |
| 5,841,550 | A | 11/1998 | Johnson |
| 5,852,813 | A | 12/1998 | Guenther et al. |
| 5,857,188 | A | 1/1999 | Douglas |
| 5,870,549 | A | 2/1999 | Bobo, II |
| 5,878,233 | A | 3/1999 | Schloss |
| 5,883,810 | A | 3/1999 | Franklin et al. |
| 5,903,878 | A | 5/1999 | Talati et al. |
| 5,910,987 | A | 6/1999 | Ginter et al. |
| 5,917,411 | A | 6/1999 | Baggarly |
| 5,917,925 | A | 6/1999 | Moore |
| 5,923,406 | A | 7/1999 | Brasington et al. |
| 5,930,479 | A | 7/1999 | Hall |
| 5,943,656 | A | 8/1999 | Crooks et al. |
| 5,944,787 | A | 8/1999 | Zoken |
| 5,971,587 | A | 10/1999 | Kato et al. |
| 5,978,475 | A * | 11/1999 | Schneier et al. ............ 713/177 |
| 5,979,750 | A | 11/1999 | Kindell |
| 5,999,967 | A | 12/1999 | Sundsted |
| 6,006,200 | A | 12/1999 | Boies et al. |
| 6,023,723 | A | 2/2000 | McCormick et al. |
| 6,028,517 | A | 2/2000 | Sansone et al. |
| 6,032,133 | A | 2/2000 | Hilt et al. |
| 6,035,402 | A | 3/2000 | Vaeth et al. |
| 6,047,264 | A | 4/2000 | Fisher et al. |
| 6,052,709 | A | 4/2000 | Paul |
| 6,064,995 | A | 5/2000 | Sansone et al. |
| 6,070,798 | A | 6/2000 | Nethery |
| 6,081,899 | A * | 6/2000 | Byrd ............... 726/2 |
| 6,138,910 | A | 10/2000 | Madruga |
| 6,148,289 | A | 11/2000 | Virdy |
| 6,152,369 | A | 11/2000 | Wilz, Sr. et al. |
| 6,161,130 | A | 12/2000 | Horvitz et al. |
| 6,199,102 | B1 | 3/2001 | Cobb |
| 6,219,669 | B1 | 4/2001 | Haff et al. |
| 6,233,565 | B1 | 5/2001 | Lewis et al. |
| 6,233,568 | B1 | 5/2001 | Kara |
| 6,243,620 | B1 | 6/2001 | Robinson et al. |
| 6,246,925 | B1 | 6/2001 | Robinson et al. |
| 6,247,149 | B1 | 6/2001 | Falls et al. |
| 6,259,964 | B1 | 7/2001 | Robinson |
| 6,275,154 | B1 | 8/2001 | Bennett et al. |
| 6,282,658 | B2 | 8/2001 | French et al. |
| 6,285,777 | B2 | 9/2001 | Kanevsky et al. |
| 6,285,991 | B1 | 9/2001 | Powar |
| 6,289,323 | B1 | 9/2001 | Gordon et al. |
| 6,308,277 | B1 | 10/2001 | Vaeth et al. |
| 6,321,333 | B1 * | 11/2001 | Murray ............... 713/156 |
| 6,321,339 | B1 | 11/2001 | French et al. |
| 6,323,782 | B1 | 11/2001 | Stephens et al. |
| 6,339,795 | B1 | 1/2002 | Narurkar et al. |
| 6,347,737 | B1 | 2/2002 | Madruga |
| 6,394,565 | B1 | 5/2002 | Greenhalgh |
| 6,425,521 | B1 | 7/2002 | Cooper |
| 6,430,457 | B1 | 8/2002 | Van De Loo |
| 6,438,690 | B1 | 8/2002 | Patel et al. |
| 6,442,571 | B1 | 8/2002 | Haff et al. |
| 6,446,045 | B1 | 9/2002 | Stone et al. |
| 6,460,050 | B1 | 10/2002 | Pace et al. |
| 6,463,354 | B1 | 10/2002 | Pintsov |
| 6,480,885 | B1 | 11/2002 | Olivier |
| 6,493,685 | B1 | 12/2002 | Ensel et al. |
| 6,496,936 | B1 | 12/2002 | French et al. |
| 6,510,453 | B1 * | 1/2003 | Apfel et al. ............... 709/206 |
| 6,587,945 | B1 | 7/2003 | Pasieka |
| 6,604,132 | B1 | 8/2003 | Hitt |
| 6,651,063 | B1 | 11/2003 | Vorobiev |
| 6,654,448 | B1 | 11/2003 | Agraharam et al. |
| 6,675,153 | B1 | 1/2004 | Cook et al. |
| 6,691,231 | B1 | 2/2004 | Lloyd et al. |
| 6,711,624 | B1 | 3/2004 | Narurkar et al. |
| 6,741,724 | B1 | 5/2004 | Bruce et al. |
| 6,745,327 | B1 | 6/2004 | Messing |
| 6,775,782 | B1 | 8/2004 | Buros et al. |
| 6,807,530 | B1 | 10/2004 | Shub et al. |
| 6,882,269 | B2 | 4/2005 | Moreno |
| 6,933,832 | B1 | 8/2005 | Simms et al. |
| 6,967,575 | B1 | 11/2005 | Dohrmann et al. |
| 6,983,194 | B1 | 1/2006 | Stadermann |
| 7,080,041 | B2 | 7/2006 | Nagel |
| 7,194,957 | B1 | 3/2007 | Leon et al. |
| 7,236,970 | B1 | 6/2007 | Winslow |
| 7,346,591 | B2 | 3/2008 | Sansone |
| 7,437,414 | B2 | 10/2008 | Dean |
| 2001/0011274 | A1 | 8/2001 | Klug et al. |
| 2001/0020235 | A1 | 9/2001 | Game |
| 2001/0032115 | A1 | 10/2001 | Goldstein |
| 2001/0032181 | A1 | 10/2001 | Jakstadt et al. |
| 2001/0044785 | A1 | 11/2001 | Stolfo et al. |
| 2002/0002590 | A1 | 1/2002 | King et al. |
| 2002/0023059 | A1 | 2/2002 | Bari et al. |
| 2002/0024438 | A1 | 2/2002 | Roberson |
| 2002/0032597 | A1 | 3/2002 | Chanos |
| 2002/0033598 | A1 | 3/2002 | Beasley |
| 2002/0049672 | A1 | 4/2002 | Kitchen et al. |
| 2002/0063148 | A1 | 5/2002 | Cox et al. |
| 2002/0069174 | A1 | 6/2002 | Fox et al. |
| 2002/0103868 | A1 | 8/2002 | Khan |
| 2002/0143462 | A1 | 10/2002 | Warren |
| 2003/0023561 | A1 | 1/2003 | Stefik et al. |

(56) References Cited

U.S. PATENT DOCUMENTS

| | | | |
|---|---|---|---|
| 2003/0077409 A1 | 4/2003 | Schnell | |
| 2003/0140017 A1 | 7/2003 | Patton et al. | |
| 2003/0187951 A1 | 10/2003 | Shen | |
| 2004/0002903 A1 | 1/2004 | Stolfo et al. | |
| 2004/0243690 A1 | 12/2004 | Hancock et al. | |
| 2005/0033659 A1 | 2/2005 | Zucker et al. | |
| 2007/0239569 A1 | 10/2007 | Lucas et al. | |
| 2008/0133411 A1 | 6/2008 | Jones et al. | |
| 2008/0306758 A1 | 12/2008 | Chalmers et al. | |

FOREIGN PATENT DOCUMENTS

| | | |
|---|---|---|
| WO | WO 97/12460 | 4/1997 |
| WO | WO 99/16226 | 4/1999 |
| WO | WO 99/66428 | 12/1999 |
| WO | WO 00/13368 | 3/2000 |
| WO | WO 01/00069 | 1/2001 |
| WO | WO 01/18718 A1 | 3/2001 |
| WO | WO 01/65444 | 9/2001 |
| WO | WO 01/99005 | 12/2001 |
| WO | WO 01/99009 | 12/2001 |
| WO | WO 01/99037 | 12/2001 |
| WO | WO 02/08961 | 1/2002 |
| WO | WO 02/21315 | 3/2002 |
| WO | WO 0233604 A2 | 4/2002 |
| WO | WO 02/066344 | 8/2002 |
| WO | WO 02/079947 | 10/2002 |
| WO | WO 03/023677 | 3/2003 |

OTHER PUBLICATIONS

"Connect announces OneServer interactive online application platform," Business Wire, Apr. 10, 1995, p. 4101043, retrieved from Dialog, Dialog No. 07797909 (2 pages).
International Preliminary Examination Report in PCT/US01/08487, mailed Jan. 23, 2002 (4 pages).
International Preliminary Examination Report in PCT/US01/08488, mailed Jun. 11, 2003 (11 pages).
International Search Report in PCT/US01/08490, mailed Jan. 22, 2002 (6 pages).
"Joint Direct Bill Payment Form for Mich. Utilities," Bank Technology News, Apr. 1994, p. 8, retrieved from Dialog, Dialog No. 03302326 (1 page).
Newkirk, K.M., "Banks can slice transaction costs," Independent Banker, Dec. 1995, vol. 45, No. 12, pp. 52-53, retrieved fro Dialog, Dialog No. 00276769 (3 pages).
"Recommendation F.400/X.400 message handling and directory services—operation and definition of service," Nov. 14, 1988, CCITT, Melbourne, XP002186347 (10 pages).
Campbell et al., "Methods and Systems for Proofing Identities Using a Certificate Authority," Pending U.S. Appl. No. 09/809,325, filed Mar. 16, 2001.
Orbke et al., "Methods and Systems for Establishing an Electronic Account for a Customer," Pending U.S. Appl. No. 09/809,328, filed Mar. 16, 2001.
Cook et al., "Methods and Systems for Providing a Secure Electronic Mailbox," Pending U.S. Appl. No. 09/809,312, filed Mar. 16, 2001.
Campbell et al., "Methods and Systems for Providing an Electronic Account to a Customer," Pending U.S. Appl. No. 09/809,581, filed Mar. 16, 2001.
Cook et al., "Methods and Systems for Linking an Electronic Address to a Physical Address of a Customer," Pending U.S. Appl. No. 09/809,326, filed Mar. 16, 2001.
International Preliminary Examination Report in PCT/US01/19421, mailed May 16, 2002, (4 pages).
International Preliminary Examination Report in PCT/US01/23177, mailed May 3, 2002, (4 pages).
International Preliminary Examination Report in PCT/US01/28001, mailed Aug. 8, 2003, (4 pages).
International Search Report in PCT/US02/04866, mailed May 23, 2002, (1 page).
International Search Report in PCT/US02/09870, mailed Dec. 5, 2002, (2 pages).
PCT Written Opinion in PCT/US01/08488, mailed Oct. 28, 2002, (9 pages).
PCT Written Opinion in PCT/US01/19384, mailed Jun. 17, 2002, (4 pages).
PCT Written Opinion in PCT/US02/04866, mailed May 23, 2003, (4 pages).
PCT Written Opinion in PCT/US02/09870, mailed Mar. 6, 2003, (5 pages).
"American Express Invests in Respond.com," M2 Presswire, Mar. 9, 2000 [recovered from Dialog database on Jun. 5, 2007].
"Purchasing tools for the Internet Toolbox." Carbone, Jim, Purchasing, vol. 123, Dec. 11, 1997 [recovered from Dialog database on Jun. 5, 2007].
Bachmann et al., "Implement LDAP Search Queries with SQL," Dec. 1, 1998, IBM Disclosure.
"Export management firms provide alternatives," Anonymous, Carin's Chicago Business, Chicago: Dec. 12, 1983, vol. 6, Issue 50; p. 17 [retrieved from ProQuest Dec. 19, 2005] (1 page).
"Faster Freight: couriers and expedited carriers broaden their approach to better serve Canadian shippers.".
Materials Management and Distribution. Toronto: Oct. 1996, vol. 41, Issue 10; p. 34 [retrieved from ProQuest Dec. 19, 2005] (2 pages).
"A new look for MSDS." Campbell, Sharon Lynn. Occupational Health and Safety. Waco: Jun 1992. vol. 61, Issue 6; p. 62 [retrieved from ProQuest Dec. 19, 2005] (5 pages).
Stephens, G., "Australia to Personalize New Stamps with Photographs of Show Visitors," Linn's Stamp News [online], Mar. 22, 1999. (Retrieved on May 3, 2002 from www.lins.com/print/archives/20000403/news3.asp).
Bartholomew, D., "The Future of Snail Mail: the Postal Service is gearing up for competition. But can it deliver?" Information Week, Dec. 4, 1995, n556, pp. 34-36.
International Search Report, PCT/US01/19384, dated Nov. 16, 2001 (5 pages).
International Search Report, PCT/US01/19421, dated Nov. 19, 2001 (6 pages).
Fast Facts, Back Issue (from Fedex Website http://www.fedex.com/us/customer/fastfacts/backissues/101100fastfacts.html) dated Oct. 11, 2000.
eBusiness Tools, Fedex Ship Manager Software (from Fedex Website http://www.fedex.com/us/ebusiness/eshipping/ship.html), accessed Nov. 28, 2001.
International Search Report, PCT/US01/28001, dated Dec. 21, 2001 (8 pages).
International Search Report, PCT/US01/23177, dated Oct. 18, 2001 (4 pages).
Article 34 Amendment for PCT/US01/19698, dated Jan. 18, 2002 (2 pages), (relates to WO 01/99009).
Appendix K (USPS Burke Test Site Report), "User Interface Review of Mail Item Retrieval System (MIRS), Burke Station, Burke Virginia" (Dec. 24, 1998); appendix of USPS Mail Item Retrieval System (MIRS) Phase 2 Limited Production Self-Service Statement of Work (SOW) (SOW can be found in Provisional U.S. Appl. No. 60/255,407, filed Dec. 15, 2000, which is incorporated by reference into Pending U.S. Appl. No. 10/311,742, filed Dec. 19, 2002).
Appendix L, "In-plant Test Report (Re-Test Failed Items), Mail Item Retrieval System (MIRS)" (Oct. 21, 1998); appendix of USPS Mail Item Retrieval System (MIRS) Phase 2 Limited Production Self-Service Statement of Work (SOW) (SOW can be found in Provisional U.S. Appl. No. 60/255,407, filed Dec. 15, 2000, which is incorporated by reference into Pending U.S. Appl. No. 10/311,742, filed Dec. 19, 2002).
Appendix M, "Heuristic Evaluation of the USPS Mail Item Retrieval System Early Prototype," by R. Hoffman and E. Nelson, Mitretek Systems (May 11, 1998); appendix of USPS Mail Item Retrieval System (MIRS) Phase 2 Limited Production Self-Service Statement of Work (SOW) (SOW can be found in Provisional U.S.

(56) References Cited

OTHER PUBLICATIONS

Appl. No. 60/255,407, filed Dec. 15, 2000, which is incorporated by reference into Pending U.S. Appl. No. 10/311,742, filed Dec. 19, 2002).

Czerny, "Customer Account Management System for STEWEAG Key Accounts," CIRED 97, Conf. Publ. No. 438, IEEE, Jun. 2-5, 1997.

Stafford et al., "Delivering Marketing Expertise to the Front Lines," IEEE Expert, Apr. 1994, pp. 23-32.

Bhushan et al., "Federated Accounting: Service Charging and Billing in a Business-to-Business Environment," 0-7803-6719, IEEE, Jul. 2001, pp. 107-121.

International Search Report, PCT/US01/27690, dated Nov. 19, 2001 (6 pages).

Q165: What is X.509 http://members.x5.net/faqs/crypto/q165.html Feb. 1, 1998.

Bachmann, et al., "Implementing LDAP Search Queries with SQL," Dec. 1, 1998, IBM TDB, (7 pages).

International Preliminary Examination Report in PCT/US01/19384, mailed Jan. 17, 2003 (4 pages).

\* cited by examiner

SYSTEMS AND METHODS FOR AUTHENTICATING AN ELECTRONIC MESSAGE

CROSS REFERENCE TO RELATED APPLICATIONS

This is a continuation of application Ser. No. 13/333,175, filed on Dec. 21, 2011, which is a continuation of application Ser. No. 12/457,683, filed on Jun. 18, 2009, which is a divisional of U.S. application Ser. No. 09/675,677, filed on Sep. 29, 2000, which claims priority under 35 U.S.C. § 119 of U.S. Provisional Application No. 60/157,168, filed on Sep. 30, 1999, and U.S. Provisional Application No. 60/189,983, filed on Mar. 17, 2000, all of which are expressly incorporated herein by reference.

BACKGROUND OF THE INVENTION

1. Field of the Invention

The present invention relates to systems and methods for providing electronic communication services to customers. More particularly, the invention relates to systems and methods for providing content and temporal integrity and identification verification to electronic messages shared by users over a network.

2. Description of the Related Art

The use of electronic networks to convey information among networked users has undergone an enormous amount of growth in recent years. The ability to transfer data using computer applications, such as, for example, e-mail and file transfer protocol programs, has become increasingly important in personal, and especially, business communications.

Using computer networks for business communications, including buying and selling goods online, electronic funds transfer, online advertising, and accessing business information resources is known as electronic commerce (E-commerce). E-commerce can improve the efficiencies of current business processes and provide opportunities to widen existing customer bases. Over the next few years, as the number of Internet users continues to expand, E-commerce has the potential to be the source of an extraordinary amount of revenue growth.

In order to realize this potential, a variety of communication services and features will be required for E-commerce which traditionally have been available in physical communication channels. The United States Postal Service (USPS), an independent establishment of the executive branch of the U.S. government, provides such features through a variety of document and package delivery services. The USPS is widely recognized as a secure and reliable means for sending and receiving packages and mail used for both personal and business transactions. Packages and mail sent via the USPS are time-stamped with an official postmark which provides the recipient proof of the time the item was sent. Additionally, once material is placed with the USPS, the document is no longer in the sender's control, and thus cannot be recalled. Furthermore, packages and mail sent through the USPS are protected from third-party tampering by Federal laws. Electronic communication services currently do not provide these features. Additional security enhancements, such as authenticating the identities of the parties involved in a transaction and/or providing assurance to the recipient that a received message has not been altered may also be required for E-commerce to reach its full potential.

To ensure the vitality and growth of electronic communication and commerce, consumers and businesses need a secure way to communicate and conduct business electronically. Without trustworthy channels of communication, many potential participants in electronic commerce may be unwilling to send sensitive information electronically. In light of the foregoing, it is desirable to provide a system for electronic communication that provides a level of security which meets or exceeds the current level offered by the existing physical mail and package delivery services.

SUMMARY OF THE INVENTION

In accordance with the purpose of the present invention, as embodied and broadly described herein, the invention provides methods and apparatuses for authenticating an electronic message. The electronic message containing data and an electronic address is received from a sender. A digest is then created based on the message data and a temporal stamp is appended to this digest. The digest and temporal stamp are signed using a digital signature. The digest, the temporal stamp, and the digital signature are then sent to an electronic address and thereafter authenticated.

Exemplary systems and methods consistent with the present invention are recited in the attached claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the following description, serve to explain the principles of the invention. In the drawings.

DESCRIPTION OF THE PREFERRED EMBODIMENTS

Reference will now be made in detail to the present preferred embodiments of the invention, examples of which are illustrated in the accompanying drawings. Whenever possible, the same reference numbers will be used throughout the drawings to refer to the same or like parts.

Figure 1:
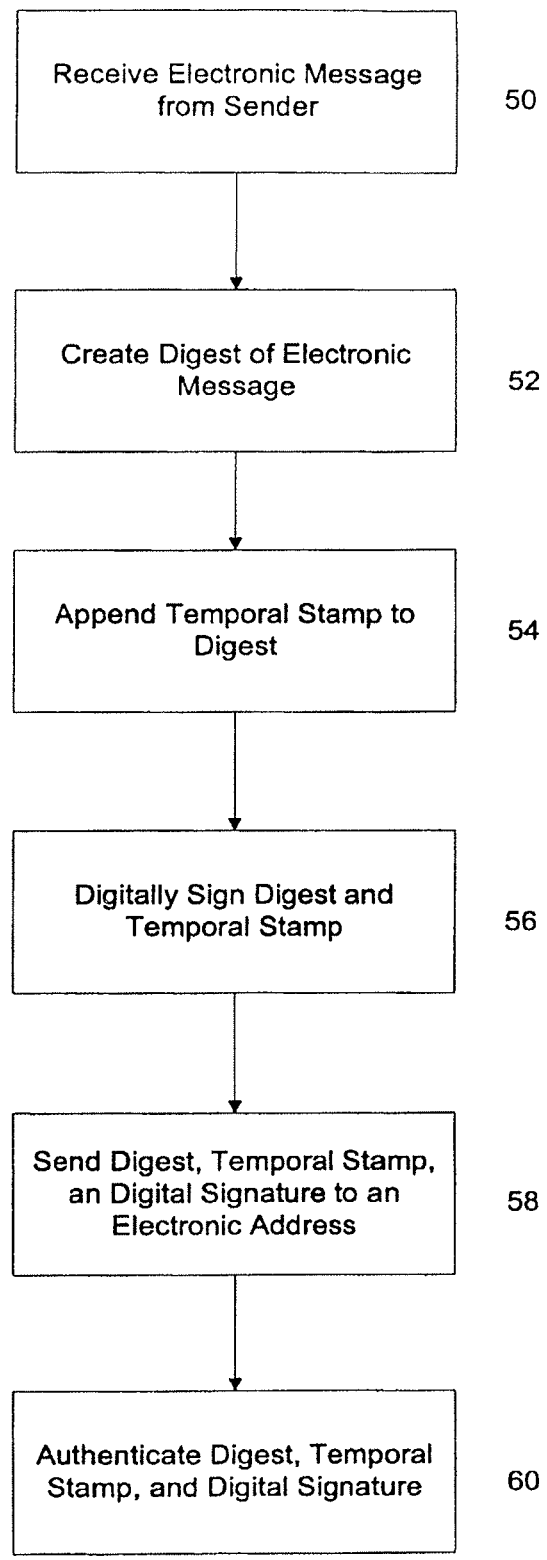
FIG. 1 is a flow chart of a method consistent with the present invention.

FIG. 1 shows a flow chart of a method consistent with the present invention. A sender will generate an electronic message, containing message data and a destination electronic address, for which authentication is desired. The sender submits the electronic message over a network to an EPM (Electronic PostMark) system for authentication. The EPM system then receives the electronic message from the sender (Step 50). The EPM system then creates a tag or "digest" from the electronic message (Step 52). The digest is a digitally compressed representation unique to the electronic message. The EPM system then appends a temporal stamp to the digest (Step 54). The temporal stamp includes the time and date denoting when the temporal stamp was applied. The digest and the temporal stamp are then signed by the EPM server using a digital signature (Step 56). The digital signature, digest, and temporal stamp are sent by the EPM server over the network to the destination electronic address (Step 58). The digital signature, digest, and temporal stamp are then authenticated (Step 60). The authentication process typically takes place on the data processing machine at the electronic address; however, the authentication could take place on a different data processing machine.

Figure 1A:
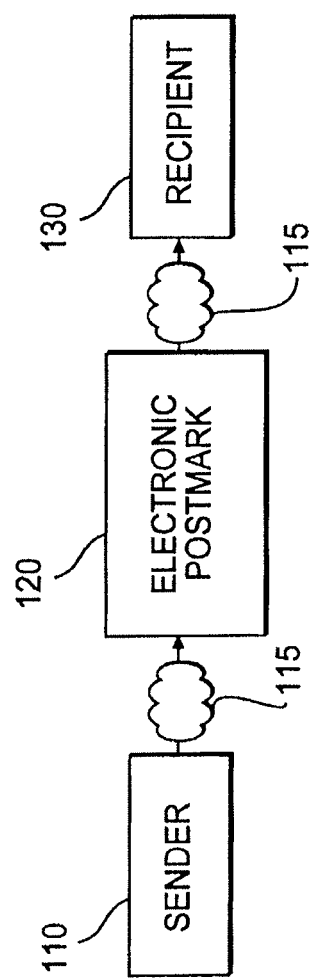
FIG. 1A is a simplified block diagram of first operational mode for a system to authenticate electronic messages in accordance with the present invention.

FIG. 1A shows a simplified block diagram of a first mode of operation for a system consistent with the present invention. A sender 110 generates the electronic message, including the destination electronic address, for transfer over a network 115 which may be a public network such as the Internet. The message can be a digital document in any type of format. The electronic message, along with the destination electronic address, is received by an EPM system 120. EPM system 120 then generates an EPM data structure. The EPM data structure includes the digest and the temporal stamp. The digest and temporal stamp are digitally signed by the EPM system 120, and the resulting digital signature is also included in the EPM data structure. As known to those skilled in the art, a digital signature is extra data appended to input data which authenticates both the input data and the identity of any signer over the input data.

For this invention, the digital signature ensures the authenticity of the EPM data structure and the identity of the EPM system 120. Any unauthorized modifications to the temporal-stamp or the digest can be detected through examining the digital signature. Furthermore, any alterations in the electronic message itself may be detected though examining the digest. Therefore, the EPM data structure can afford at least three assurances for an electronic transaction. The first is the electronic message existed at a known point in time. The second assurance is the identification of EPM system 120 is known to a recipient 130 of the electronic message. The third assurance is alteration of the contents of the electronic message as received by recipient 130 is detectable after the generation of the EPM data structure.

Further referring to FIG. 1A, the recipient 130 typically receives the EPM data structure and the electronic message over network 115 from EPM server 120. Recipient 130 may then verify the identity of the signer of the EPM data structure and the integrity of the electronic message using the EPM data structure and verification application. The verification application is discussed in more detail below.

Sender 110 may elect to have EPM system 120 forward only the EPM data structure to recipient 130 and may then send the electronic message itself to recipient 130 directly over the network. This procedure provides sender 110 with more control in how the electronic message is routed through EPM system 120, as will be described below.

Each time an EPM data structure is generated, it is stored in a log located within EPM system 120. This log provides an actual record which can be used to prove that an EPM data structure was generated for a given message. One advantage of the invention is that electronic messages which have been postmarked by EPM system 120 may be afforded legal protections under laws which protect official entities, such as the USPS. Therefore, EPM data structures stored in the log file can serve as legal proof of the existence and digest of an electronic message. An EPM data structure of the log file itself may be generated to insure the integrity of the log file.

Figure 1B:
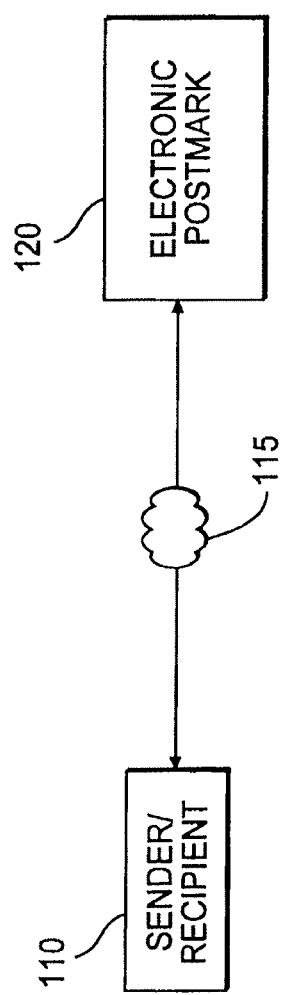
FIG. 1B is a simplified block diagram of a second operational mode for a system to authenticate electronic messages in accordance with the present invention.

FIG. 1B shows a simplified block diagram of a second mode of operation for a system consistent with the present invention. In this mode of operation, sender 110 and recipient 130 are the same entity. Sender 110 prepares an electronic message and submits it via network 115 to EPM system 120 in the same manner as described above. However, in this embodiment, the electronic address is included with the electronic message is that of sender 110. EPM system 120 generates an EPM data structure as before, and then typically returns only the EPM data structure back to sender 110. This mode of operation allows sender 110 to use EPM system 120 as a type of electronic verification service, whereby sender 110 can validate the existence of an electronic message at a specific point in time and the contents of the message at that point in time. If so desired, sender 110 may also receive a copy of the submitted electronic message that was used by EPM system 120 to generate the EPM data structure.

Figure 2A:
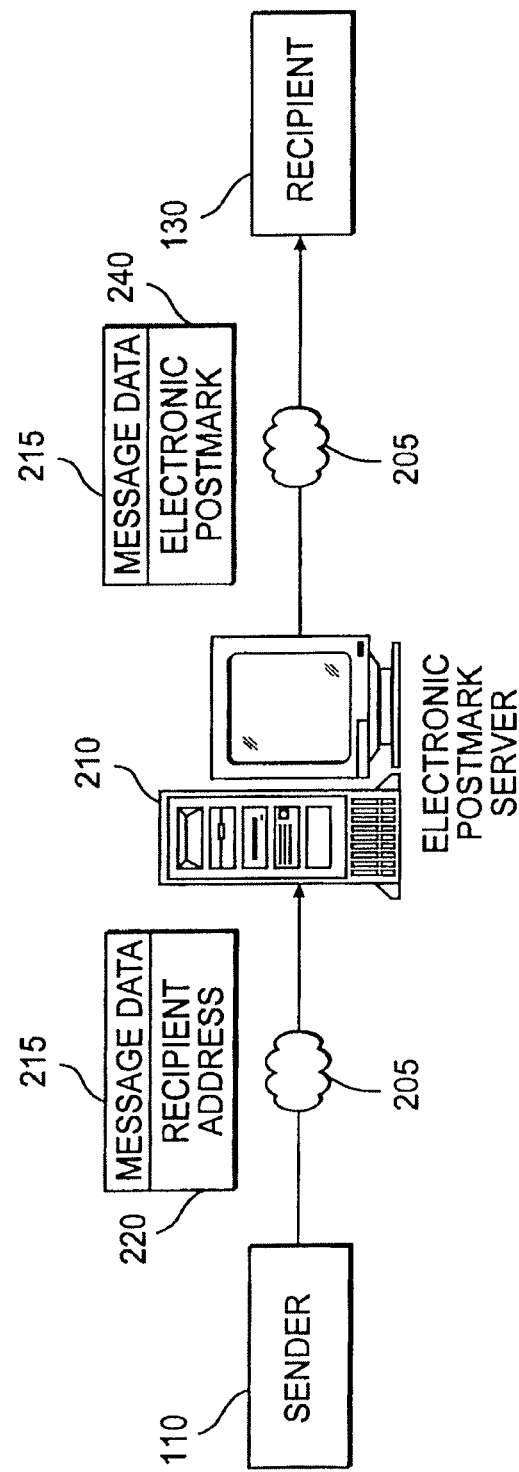
FIG. 2A is a simplified block diagram of the first embodiment for a system to authenticate electronic messages in accordance with the present invention.

FIG. 2A shows a more detailed embodiment of a system consistent with the present invention. Sender 110 generates an electronic message and sends message data 215, along with an electronic recipient address 220, to an authentication server, called an EPM server 210, over a network 205. Sending the electronic message can be done with an e-mail program, such as, for example, Outlook Express™, or may be done by other methods known to those skilled in the art. Preferably, EPM server 210 is a workstation-class computer, such as, for example, an Intel-based workstation running Windows NT® 4.0. However, other data processing machines known to those skilled in the art may also be used. In this embodiment, EPM server 210 may be a standalone server which accepts data over a network from any external source. Network 205 is preferably a TCP/IP based network which is part of the Internet, but could be, for example, a local area network, Virtual Private Network, a wireless network, and/or any other type of computer network known to those skilled in the art.

EPM server 210 generates an EPM data structure 240 that includes a digest, a temporal-stamp, and a digital signature as described above. After EPM data structure 240 has been generated, EPM server 210 will typically forward the EPM data structure with the electronic message to recipient 130 over network 205. Alternatively, sender 110 may choose to only have EPM data structure 240 forward by EPM server 210 to recipient 130.

Figure 2B:
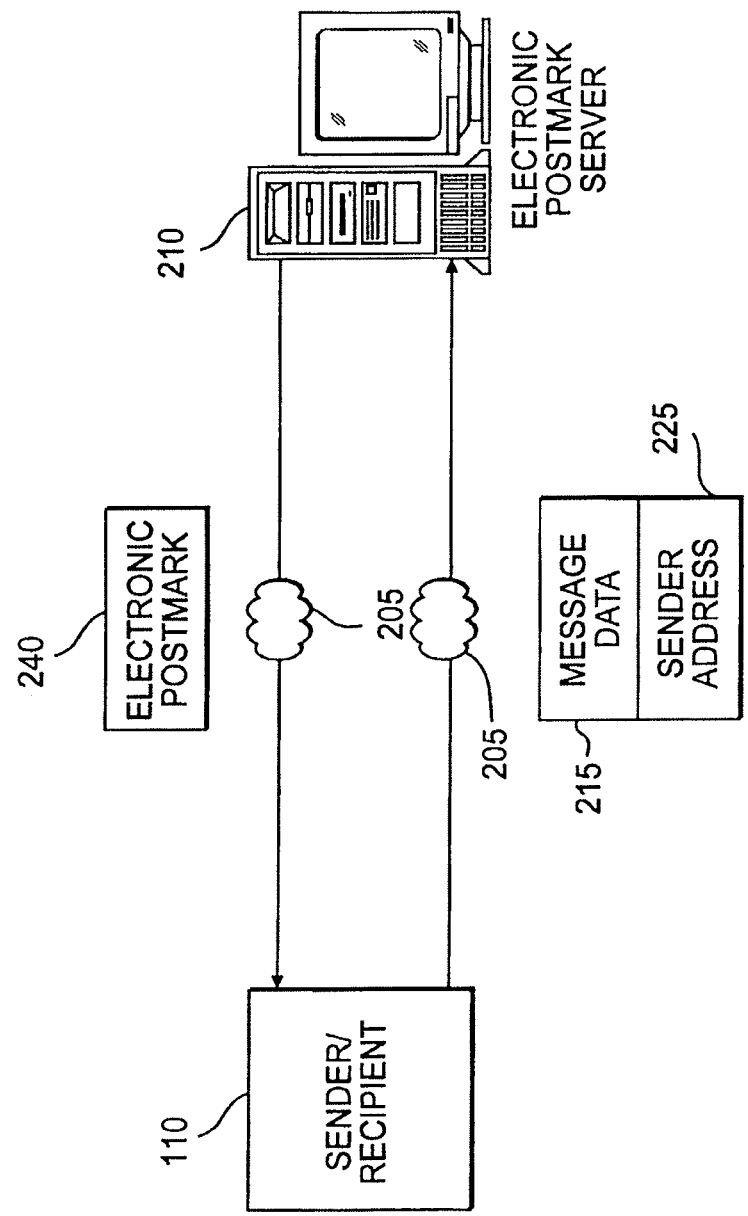
FIG. 2B is a simplified block diagram of the second embodiment for a system to authenticate electronic messages in accordance with the present invention.

FIG. 2B depicts the second embodiment of the invention wherein sender 110 and recipient are the same entity. Sender 110 prepares an electronic message and submits message data 215 and an electronic address through network 205 to EPM server 210 in the same manner as described for FIG. 2. However, in this mode, a sender electronic address 225, rather than recipient electronic address 220 (not shown), is provided with message data 215. EPM server 210 generates an EPM data structure as in the first embodiment, and then submits the EPM back to sender 110. Alternatively, sender 110 may have a copy of message data 215 returned with EPM data structure 240 if desired.

Figure 3A:
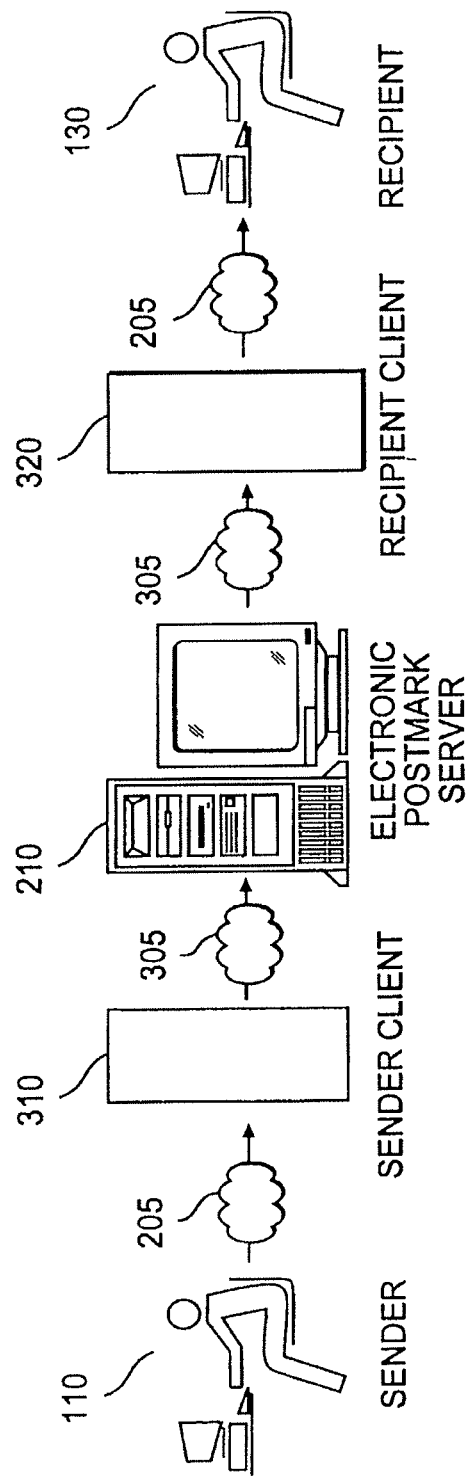
FIG. 3A is block diagram showing components of a third embodiment for a system in accordance with the present invention.

FIG. 3A illustrates a third embodiment consistent with the invention. Sender 110 may consist of a user and a networked device. The networked device will typically be a personal computer. Other examples of a networked device include, but are not limited to, Personal Digital Assistants (PDAs), cell phones, dedicated network terminals, a network server, and other types of electronic devices known to those skilled in the art. It should be noted that the entity which creates the electronic message need not be a human user. Some electronic messages may be generated automatically by computer and submitted for EPMs at predefined times. For example, a business may program a computer to automatically submit electronic bills to customers on a monthly basis through a network and wish to have EPMs generated for these submissions. The embodiment of FIG. 3A is similar to the embodiment of FIG. 2A, except that client entities 310 and 320 are between sender 110 and EPM server 210, and EPM server 210 and recipient 130, respectively. Client entities 310. and 320 provide protection for securing EPM server 210 against unauthorized access and process data to allow. EPM server 210 to accept and provide data in standardized formats.

Referring again to FIG. 3A, sender 110 submits a request in the form of an electronic message to a sender client 310 to obtain an EPM. Sender client 310 may be a separate data processing machine, such as, for example, a personal computer or an Intel-based workstation using Windows NT® 4.0 as an operating system. Alternatively, sender client 310 may be a collection of software modules residing in the networked device of sender 110. In the event sender client 310 is a separate machine, it will receive the request for an EPM over network 205. After sender client 310 accepts the request from sender 110, it processes the request (in a manner described below in greater detail) and transfers the results to EPM server 210 over a secure network 305. If sender client 310 is in close proximity to EPM server 210, secure network 305, could a Local Area Network (LAN) which uses TCP/IP, or another network protocol known to those skilled in the art. If sender client 310 is not in close proximity to EPM server 210, secure network 305 may be Virtual Private Network (VPN) communicating in a secure manner over the Internet. While only one EPM server 210 is shown in FIG. 3A, multiple servers could be used to provide additional reliability. In this embodiment, EPM server operates in a secure environment whereby it has no insecure connection to an external network such as the Internet.

Further referring to FIG. 3A, once EPM server 210 receives the processed request from sender client 310, it generates an EPM data structure and forwards the EPM data structure and recipient electronic address data to a recipient client 320 over secure network 305. Recipient client 320 may be a separate data processing machine located practically at any distance from EPM server 210. Like sender client 310, it may be, for example, a personal computer or Intel-based workstation using Windows NT® 4.0 as an operating system. Alternatively, recipient client may be a collection of software modules residing at recipient 130. If recipient client 320 is a separate data processing machine, it forwards the EPM data structure to recipient 130 over network 205. Recipient 130 may comprise a user and data processing machine, as described for sender 110 above, or may be a computer, only, automatically processing the received EPMs. Once the EPM data structure is received, recipient 130 may authenticate the EPM data structure and the identity of the signer (the EPM server 210) and, if the corresponding electronic message is available, the electronic message itself. This authentication process may occur at the data processing machine of recipient 130, or it may be performed by a separate data processing machine.

In order to properly authenticate the received EPM data structure, a data processing machine typically requires four elements: a verifier application, the EPM data structure, the electronic message, and an authorized public digital key. EPM server 210 uses a digital signature algorithm to digitally sign EPM data structures. The digital signature is based on public and private digital key pairs. Digital certificates authorize the use of these key pairs used to generate and verify the digital signature. The key authorization process is performed by a Key Signing Authority (KSA) or a Certificate Authority (CA) which issues the digital certificates. These are trusted, separate third party systems which are not directly coupled to EPM server 210. The KSA is discussed in U.S. application Ser. No. 60/157,168, filed Sep. 30, 1999, and the CA is discussed in U.S. application Ser. No. 60/189, 983, filed Mar. 17, 2000, the entire disclosures of which are incorporated by reference. The authorized public digital key may exist on a physical media in the personal possession of the recipient user 130, or it may be embedded in the verifier software or the EPM data structure itself.

The verifier application performs three verification steps. The first step verifies that the EPM data structure is "official;" that is, it was generated by an authorized entity such as the USPS. It does this by checking the digital certificate associated with the public digital key used to generate the digital signature. When this verification is complete, recipient 130 has proof that the EPM data structure was issued by an official EPM entity.

The second verification step is to verify the identification of the EPM server 210. The digital signature that was used to sign the EPM data structure is verified using the authorized public digital key. When this verification is successful, recipient 130 has proof that the EPM data structure was generated by a particular authorized server (i.e., the identification of EPM server 210 is known) and that alterations to the contents of the EPM data structure, from the time it was generated until the time it reached recipient 130, are detectable. This effectively authenticates the digest and temporal stamp within the EPM data structure.

The third verification step is to authenticate the contents of the electronic message. The verifier application does this by comparing the digest of the message contained in the EPM data structure with a digest generated by the verifier application using the electronic message itself. If the two digests are identical, recipient 130 has proof the contents of the electronic message were unaltered from the time the EPM data structure was generated until the time the EPM data structure and electronic message were received by recipient 130.

Digital signature and electronic message verification functionality can be integrated into platform-independent verifier software which may be downloaded from the Internet. For example, such software may be developed into a Java applet for use in a web browser such as Netscape®, or it could be integrated into an e-mail software application such as Outlook® Express. Alternatively, the verifier application could take the form of an independent software application, such as, for example, a stand alone Windows-based verification utility. The verifier application can make use of standard Application Programming interfaces (APIs) to provided authentication functionality to software developers in a convenient manner.

Figure 3B:
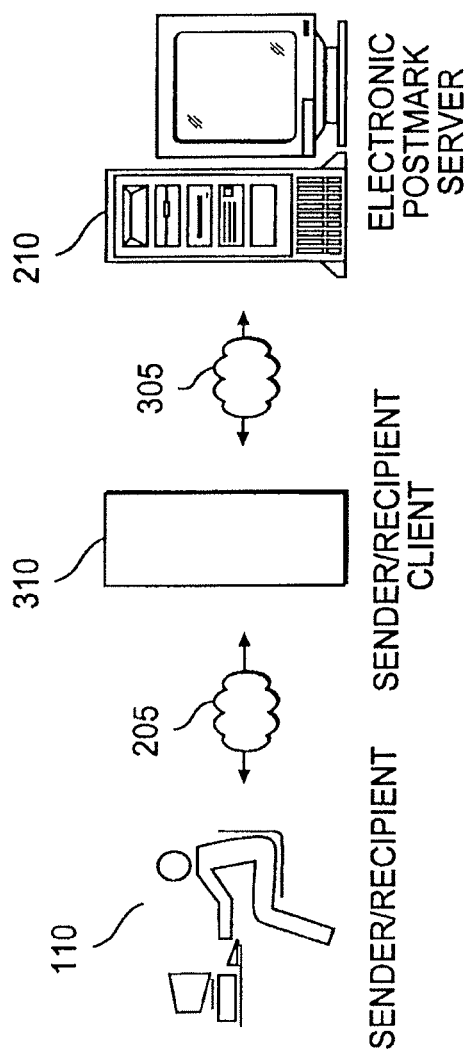
FIG. 3B is a detailed block diagram showing components of a fourth embodiment for a system in accordance with the present invention.

FIG. 3B shows a fourth embodiment consistent with the invention. This embodiment is identical to the embodiment of FIG. 3A except here sender client 310 and recipient client 320 are implemented in either the same data processing machine or in the same collection of software modules located, for example, in a networked device at sender 110. In the event they are located in the same data processing machine, sender 110 submits a request in the form of an electronic message to sender/recipient client 310 over network 205. Sender/recipient client 310 accepts and process the request and passes results to EPM server 210 over secure network 305. EPM server 210 generates an EPM data structure and returns the EPM data structure and the electronic address of sender 110 over secure network 305 to sender/recipient client 310. The EPM data structure is then returned to sender 110. Alternatively, EPM server 210 may also return a copy of the electronic message with the EPM data structure. Details of the data transfers between the components in this embodiment are described below in the explanation for FIG. 4B.

Figure 3C:
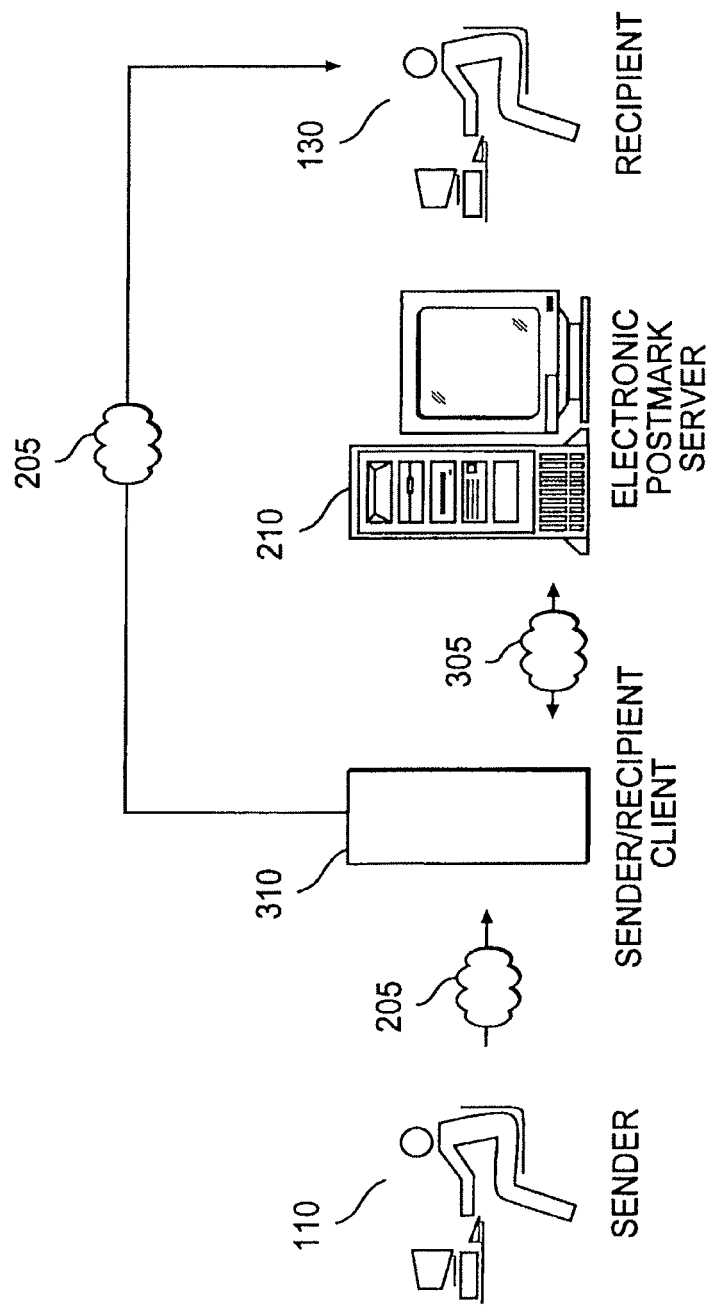
FIG. 3C is a detailed block diagram showing a fifth embodiment for a system in accordance with the present invention.

FIG. 3C shows a fifth embodiment consistent with the invention. This embodiment is a hybrid of the embodiments of FIG. 3A and 3B. Here, sender 110 submits a request in the form of an electronic message over network 205, to sender/recipient client 310, which in this embodiment is typically a separate data processing machine. Sender/recipient client 310 accepts and process the request and passes results to EPM server 210 over secure network 305. EPM server 210 generates an EPM data structure and returns the EPM data structure and the electronic address of sender 110 over secure network 305 to sender/recipient client 310. Sender/recipient client 310 then forwards the message and EPM data structure to recipient 130 over network 205. Details of the data transfers between the components in this embodiment are described below in the explanation for FIG. 4C.

Figure 4A:
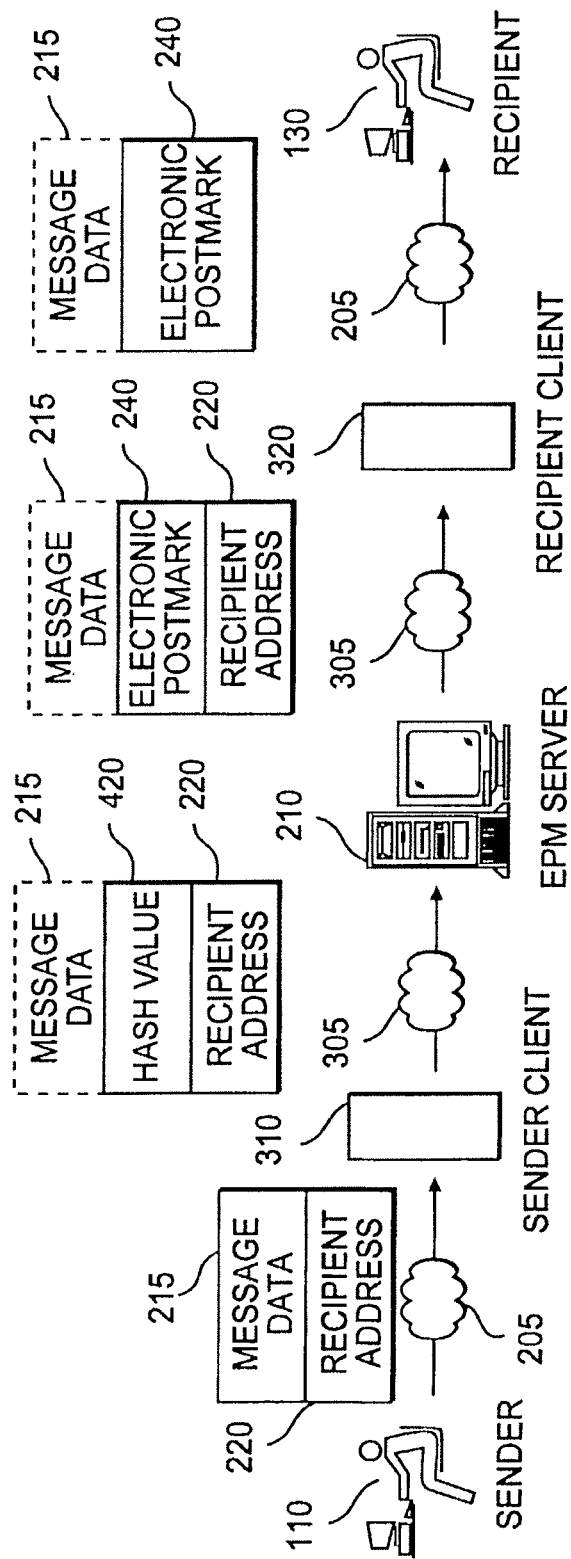
FIG. 4A is a data-flow diagram corresponding to the embodiment of FIG. 3A.

FIG. 4A depicts the data flow for the embodiment of FIG. 3A. Sender 110 generates an electronic message containing message data 215 which may be in any type of format. For example, message data 215 could be a clear-text ASCII file or encrypted ASCII file, a raw binary file, or a text-encoded binary file using base64 or other binary-to-text encoding method known to those skilled in the art.

Message data 215 is bundled with a recipient electronic address 220. If sender client 310 resides in a separate data processing machine, the bundle is sent over network 205 to sender client 310. Otherwise, if sender client 310 exists as a collection of software modules residing on the networked device of sender 110, message data 215 and recipient electronic address 220 are sent over secure network 305. Message data 215 and recipient electronic address 220 will typically be sent using an e-mail program, such as, for example, Outlook Express, running on a personal computer at sender 110. However, other types of file transfer programs using different transport protocols, such as WinFTP, may also be used.

Sender client 310 then produces a hash value 420 from message data 215 using a one-way hash function. As known to those skilled in the art, a one-way hash function typically generates a hash value from input data which is substantially smaller than the input data itself. The hash value is generated by an algorithm such that the probability of two different data streams producing the same hash value is extremely small; in fact so small that the hash value is considered unique to the input data. The one-way hash function cannot be reversed; the input data itself cannot be recovered from its corresponding hash value. Hash value 420 is thus a unique number associated on a one-to-one basis with message data 215.

Sender client 310 packages hash value 420 with recipient electronic address 220 and transfers them to EPM server 210 over secure network 305. Optionally, message data 215 may also be passed along in this transfer. A time-stamp and/or a date-stamp are generated by EPM server 210 and bundled with hash value 420. EPM server 210 then generates a digital signature using a Digital Signature Standard algorithm which is known to those skilled in the art. It then applies the digital signature to the bundled data to form an EPM data structure 240. Additional branding data, discussed in more detail below, may also be included in EPM data structure 240.

Recipient client 320 receives EPM data structure 240 and recipient electronic address 220 over secure network 305 from EPM server 210. Recipient client 320 uses recipient electronic address 220 to send EPM data structure 240 to recipient 130. If recipient client 320 is a separate data processing machine, it may use network 205 for the transfer. If recipient client 320 is a collection of software modules, for example contained in recipient 130, it typically uses secure network 305 for the transfer. Optionally, recipient 130 may also receive message data 215 itself, along with EPM data structure 240 through the recipient client 320, if sender 110 decides to route message data 215 through EPM server 210. Note that this alternative data flow is shown in the dashed boxes in FIG. 4A.

Figure 4B:
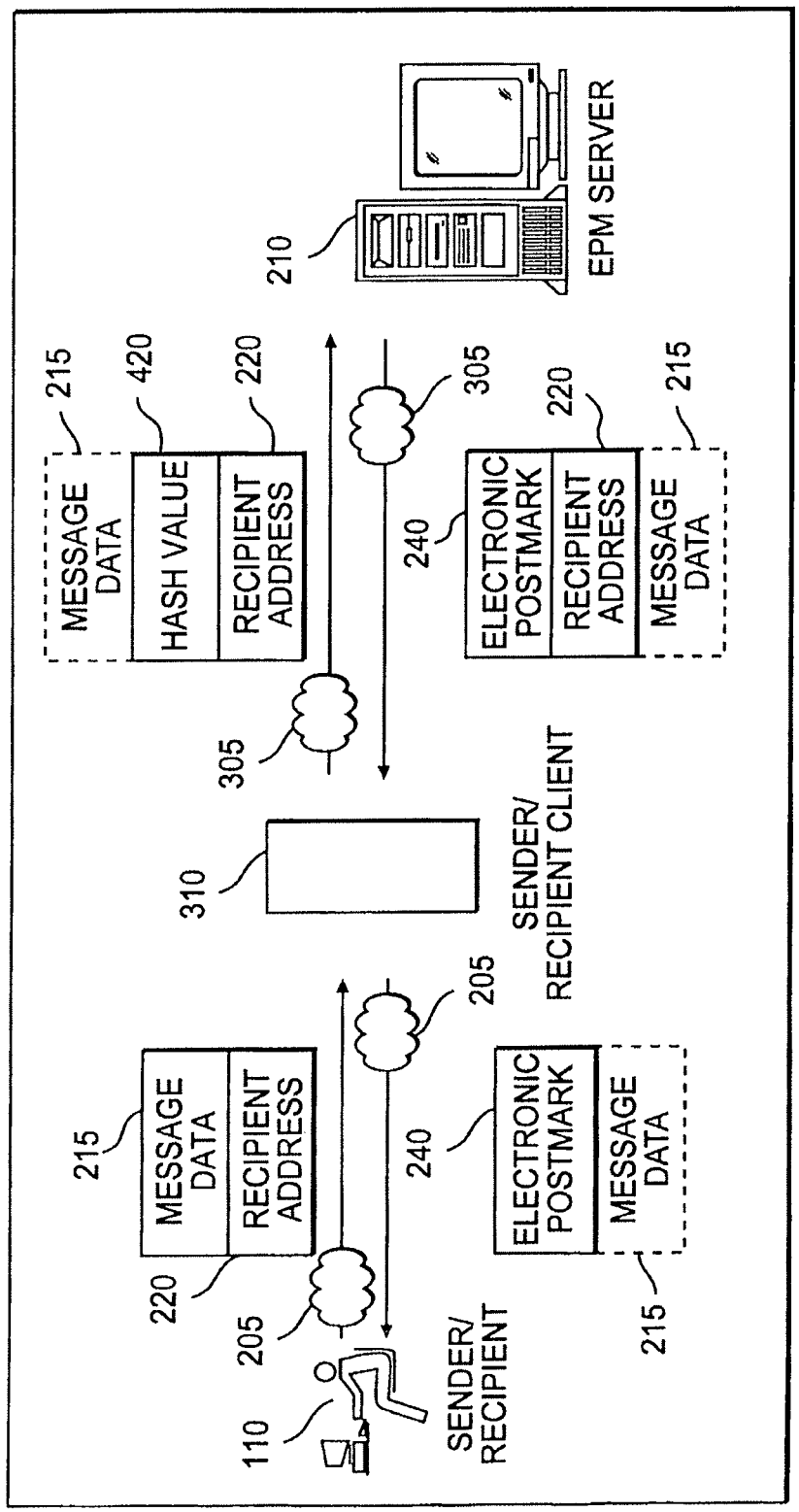
FIG. 4B is a data-flow diagram corresponding to the embodiment of FIG. 3B.

FIG. 4B illustrates the data flow for the embodiment of FIG. 3B. The data flow from sender 110 to EPM server 210 is identical to that described for FIG. 4A. In this embodiment, EPM server 210 returns EPM data structure 240 along with recipient electronic address 220, which in this case is the electronic address of sender 110, to sender/recipient client 310 over secure network 305. Using recipient electronic address 220, sender/recipient client 310 forwards the EPM data structure 240 to sender 110 over network 205.

Similarly to the data flow shown in FIG. 4A, a copy of message data 215 itself, along with EPM data structure 240, may be returned to sender 110 if desired by the sender. In this instance, message data 215 may be routed via EPM sever 210. Another option is to match EPM data structure 240 with message data 215 on sender/recipient client 310, thus obviating the need to forward message data 215 to EPM server 210. Note that these alternative data flow options are shown by the dashed boxes in FIG. 4B.

Figure 4C:
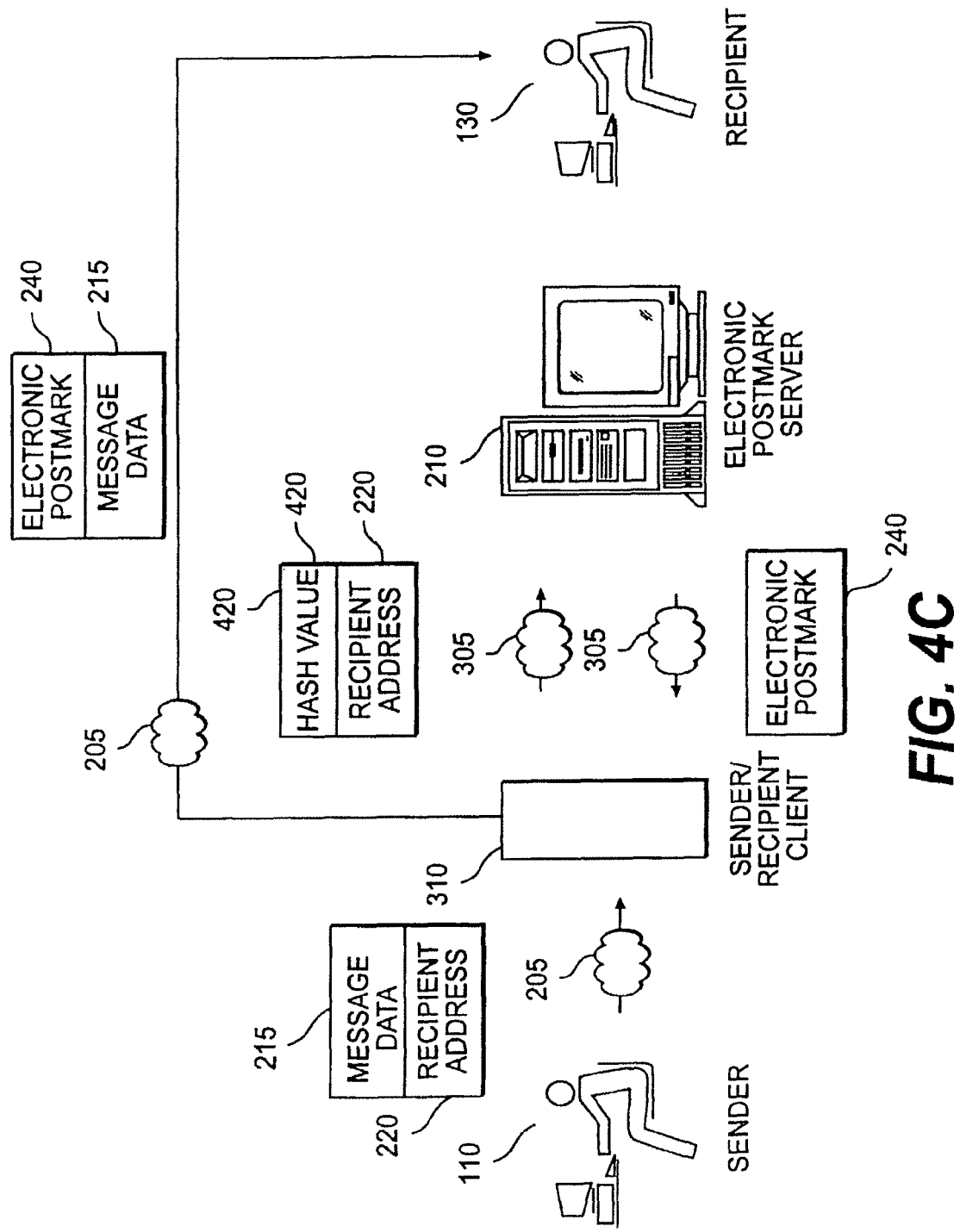
FIG. 4C is a data-flow diagram corresponding to the embodiment of FIG. 4C.

FIG. 4C illustrates the data flow for the embodiment of FIG. 3C. The data flow from sender 110 to sender/recipient client 310 is identical to that described for FIG. 4A. In this embodiment, sender/recipient client 310 forwards hash value 420 and recipient address 220 to EPM server 210. EPM server 210 generates an EPM data structure 240 and returns this data structure, along with recipient electronic address 220, to sender/recipient client 310 over secure network 305. Using recipient electronic address 220, sender/recipient client 310 forwards EPM data structure 240 and message data 215 to recipient 130. EPM data structure 240 and message data 215 will typically be sent over network 205.

Figure 5A:
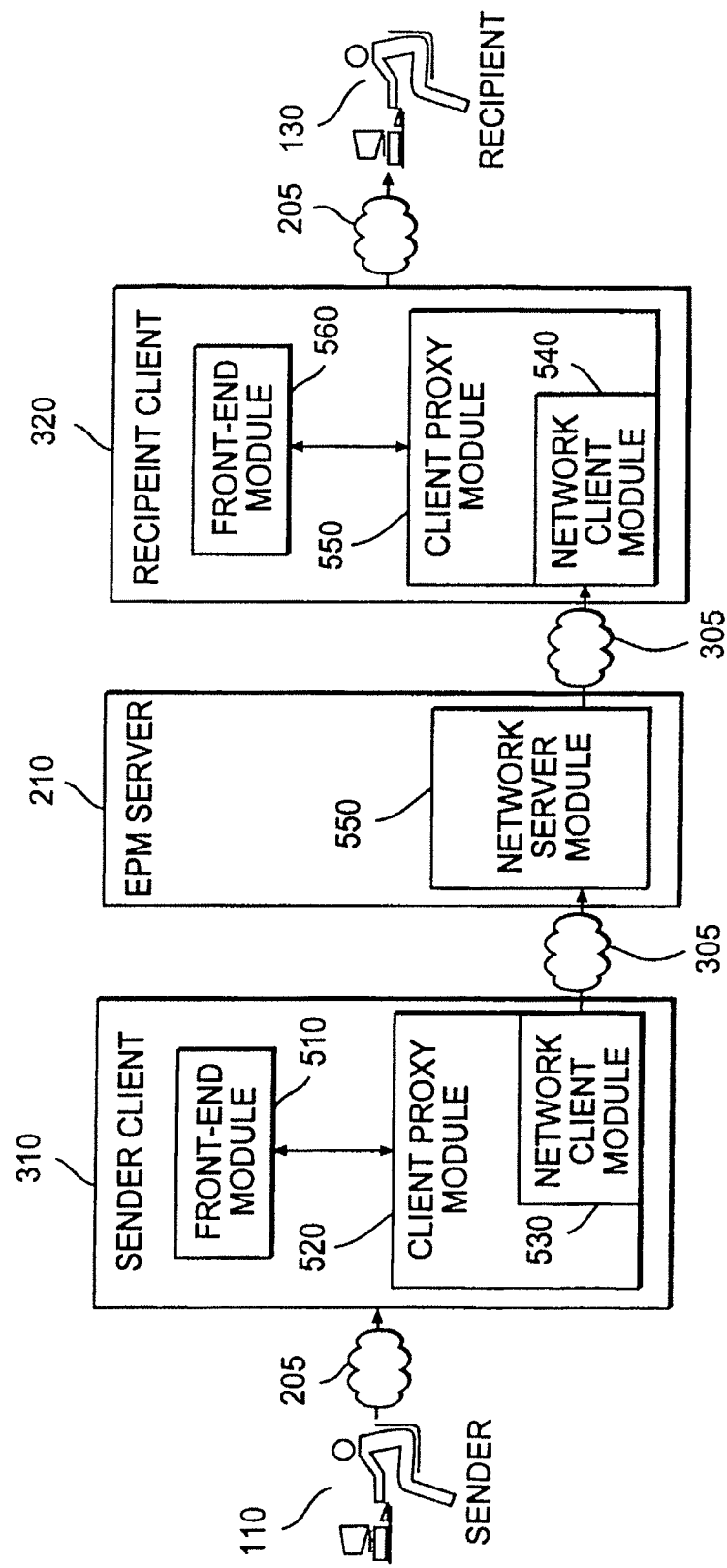
FIG. 5A is a block diagram showing software modules responsible for inter-client interaction of the embodiment of FIG. 3A.

FIG. 5A shows the software modules responsible for inter-client interaction for sender client 310, EPM server 210, and recipient client 320 for the embodiment of FIG. 3A. These modules comprise collections of software routines for execution on a data processing machine. The sender client consists of two major modules, front-end module 510 and client proxy module 520. Front-end module 510 receives requests for the generation of an EPM over network 205. Client proxy module 520 includes a network client module 530 and presents a class interface, preferably written in, but not limited to, C++, which is instantiated by front-end module 510 to handle the submission of a request for an EPM for a given message data content. Client proxy module 520 uses networking services contained in network client module 530 to send EPM transaction requests and associated data to EPM server 210. Preferable networking services use the TCP/IP standards, however, the invention is not limited to any networking protocol. Network client module 530 sends the transaction requests over secure network 305 to EPM server 210 where they are queued for subsequent processing.

EPM server 210 generates an EPM data structure 240 in response to a request and places it in an outgoing queue with any associated data for transmission over secure network 305 to recipient client 320. Recipient client 320 also includes a network client module 540 which receives EPM data structure 240 and recipient electronic address 220 and routes it to a front-end module 560 via a client proxy module 550. Front end module 560 sends the EPM data structure 240 and associated data to recipient 130 via network 205.

Figure 5B:
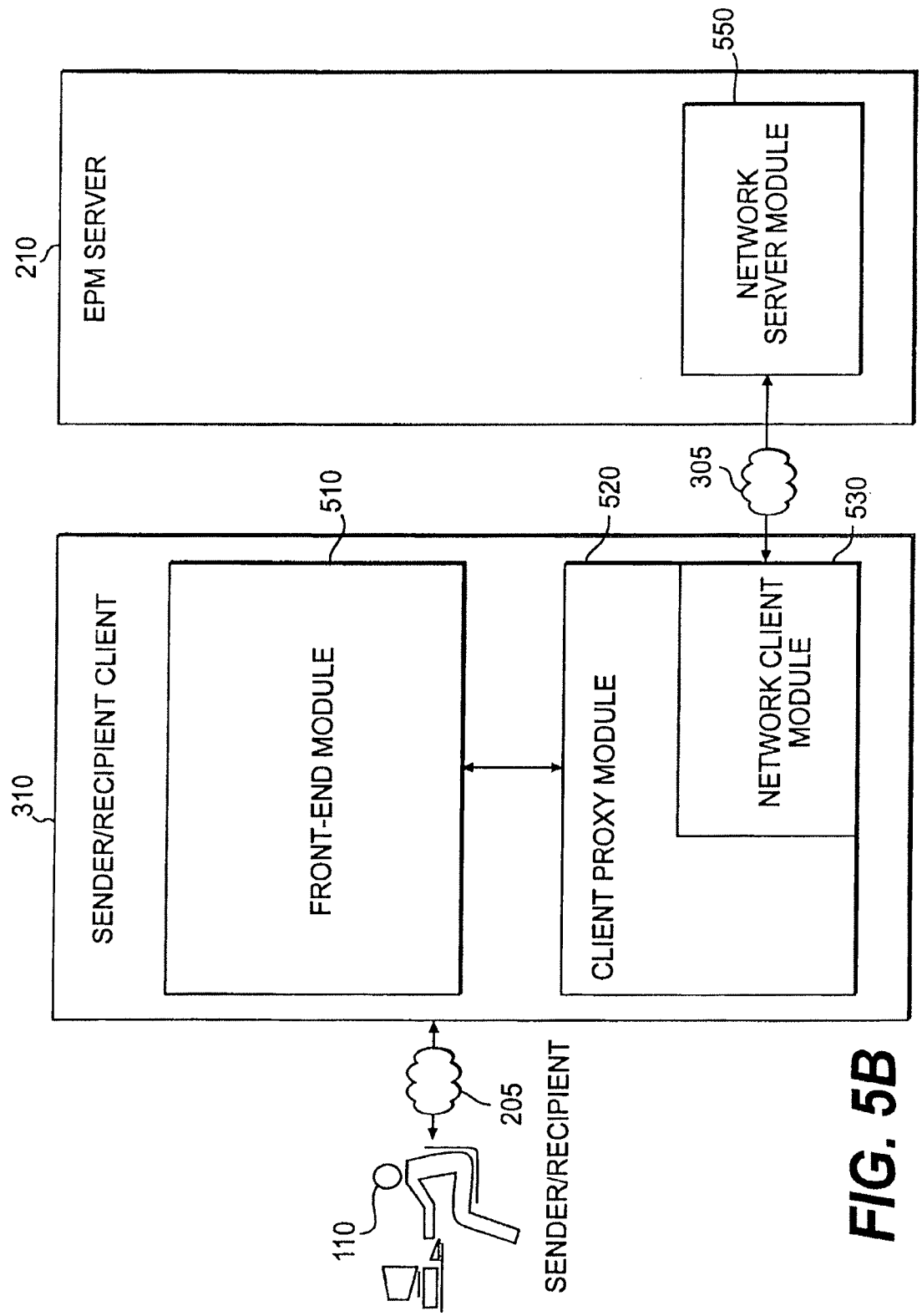
FIG. 5B is a block diagram showing software modules responsible for inter-client interaction of the embodiment of FIG. 3B.

FIG. 5B depicts the software modules responsible for inter-client interaction for the embodiment of FIG. 3B. In FIG. 5B, front-end module 510, client proxy module 520, and network client module 530 perform the identical functions of modules of the same reference numbers shown in FIG. 5A and described above. In addition, front-end module 510, client proxy module 520, and network client module 530 also perform the functions of front-end module 560, client proxy module 550, and network client module 540 shown in FIG. 5A and described above.

Figure 6:
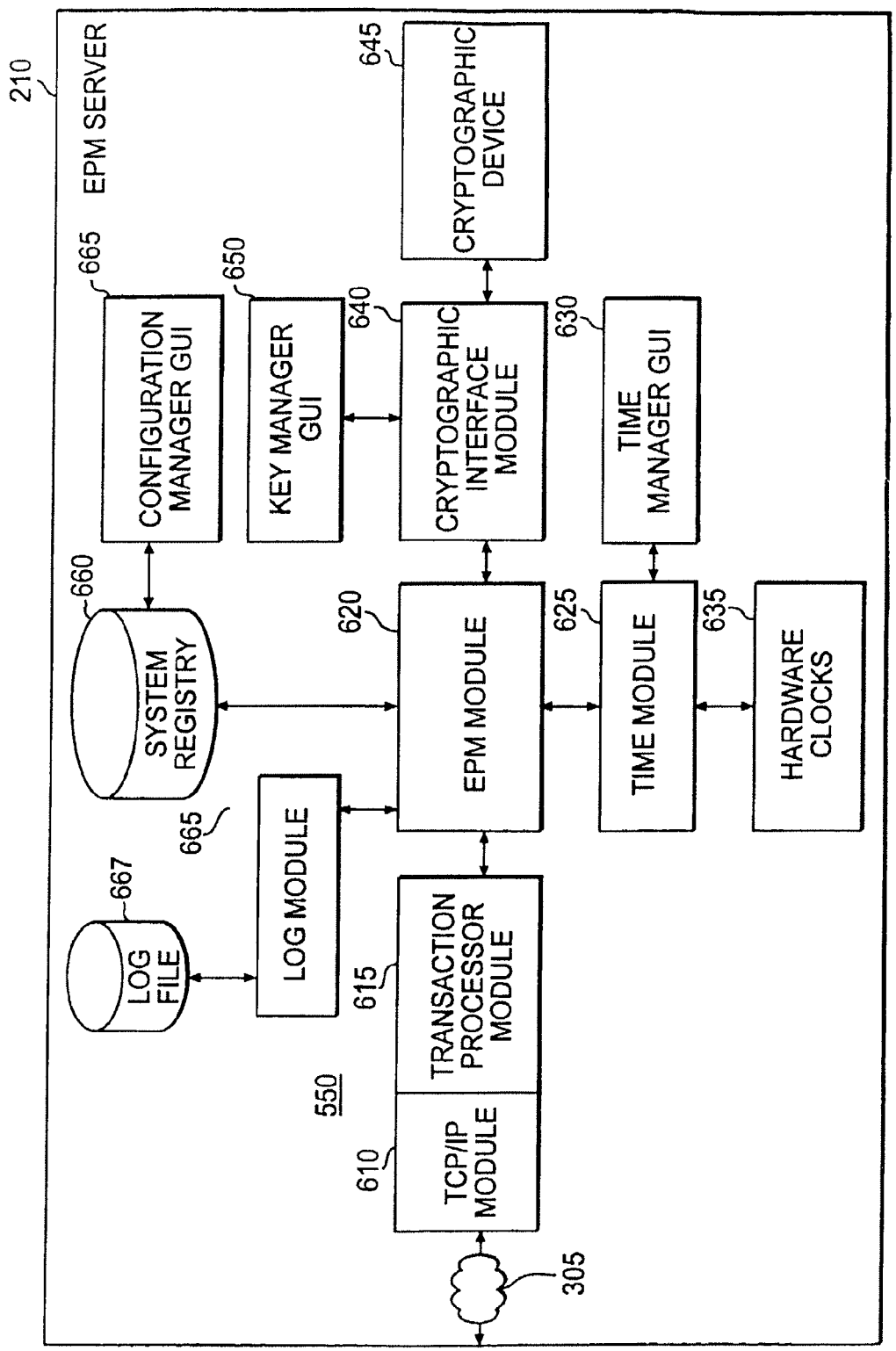
FIG. 6 is a simplified block diagram showing hardware and software components of the server of FIG. 3A.

FIG. 6 illustrates hardware and software components of EPM server 210. EPM server 210 provides a trusted and reliable service for the authentication of electronic messages. EPM server 210 thus protects electronic messages with the legal mechanisms which currently protect official entities such as the USPS. EPM server 210 is thus preferably designed, constructed, and operated as a secure computing system within an environment completely controlled by the official entity, or a trusted delegate of the official entity.

EPM Server 210 preferably comprises a fully multi-threaded server that accepts transactions from an external source, generates an EPM data structure 240, and forwards EPM data structure 240 to the entity that made the request. EPM server 210, upon receiving a sender client 310 connection, spawns a new thread performs all communication functions with sender client 310. When sender client 310 transmits a request, the new thread collects the entire request from sender client 310 then place this request on an input queue. When a thread associated with generating the actual EPM locates the request in the input queue, it flags the request as "In Progress" and then proceeds to produce an EPM data structure 240. Once the EPM generation is complete, EPM data structure 240 is placed on the outbound queue for pickup by recipient client 320, as shown in the embodiment of FIG. 3A. Alternatively, as shown in the embodiment of FIG. 3B and FIG. 3C, EPM data structure 240 may be picked up by sender/recipient client 310.

Network server module 550 includes a TCP/IP module 610 and a transaction processor module 615. Note the invention is not limited to using TCP/IP, however this standard is the preferred network protocol. Transaction processor module 615 uses the services of TCP/IP module 610 to process EPM request messages from sender client 310. Transaction processor module 615 receives each incoming EPM request and forwards it to an EPM module 620 for postmark processing. When the EPM module 620 returns the generated EPM data structure 240, transaction processor module 615 sends EPM data structure 240 it to either sender 110 or recipient 130, based upon the incoming request.

EPM module 620 uses the services of a time module 625 to obtain highly accurate time-stamps for EPMs. In addition to time and date information, EPM module 620 may gather other data items, including branding data, from a system registry 660. Branding data, which contains information regarding the corporate or organizational entity which operates EPM server 210, can take the form of text or image data. This data may represent names, slogans, logos, or any other type of identifying information, and may be included with hash value 420 and the temporal stamp.

Services from a cryptographic interface module 640 are used to generate a digital signature based on the hash value and temporal stamp to create EPM data structure 240. When the EPM operation is deemed complete, EPM module 620 uses a log module 665 to create an entry into a log file 667 which contains copies of each EPM data structure 240 generated. Log file 667 can be used for audit and billing purposes, and provides legal proof that a given EPM data structure 240 was generated. Given the importance of the log file in the audit process, the entire log file itself is used as the input data for generation of a log file EPM data structure 240 to ensure its integrity. The log file EPM data structure may be generated automatically, based on a number of criteria including the size of log file 667 or a fixed interval of time between log file EPMs. This operation may also be done manually at the command of the operator of EPM server 210.

One or more hardware clocks 635 are used to obtain and maintain accurate and trusted time information. The time values are typically generated and stored using Universal Time Coordinated (UTC), which is the same as Greenwich Mean Time. By way of example only, a TrueTime model PCI-SG Synchronized Clock Generator with GPS (Global Positioning System), commercially available from TrueTime, Inc. of Santa Rosa, Calif., may be used which has UTC accuracy of approximately one microsecond. A time manager Graphical User Interface (GUI) module 630 allows an operator to set and reset time-stamp information, synchronize time module 625 with hardware clock(s) 635, and visually check the correctness of time from hardware clock(s) 635.

Cryptographic interface module 640 uses one or more hardware cryptographic devices 645 to perform digital signature generation and verification, key generation, and hashing functions. Cryptographic hardware device 645 is able to support multiple encryption algorithms. By was of example only, an Attalla Websafe/PCI card commercially available from Compaq Corporation of Houston, Tex., may be used for cryptographic device 645. Furthermore, the Digital Signature Algorithm (DSA) with the option of Elliptic Curve DSA may be used for the digital signature algorithms. Moreover, EPM server 210 may generate Digital Signature Standard (DSS) keys and use the Secure Hash Standard FIPS 180-1, and the OSS FIPS 186. All of these examples are for exemplary purposes only, and are not meant to limit the present invention.

Cryptographic interface module 640 is controlled by a key manager GUI 650 in order to allow the generation of new digital key pairs for use by EPM server 210 and for the export of unauthorized public digital keys. Key manager GUI allows an EPM security officer to choose a location to store the unauthorized public digital key for a new key pair. Once a new pair is generated, the unauthorized public digital key of the pair is transmitted to a KSA or CA in order to transform it into an authorized public digital key. The private key of the key pair is stored within EPM server 210 and typically is not exported. The unauthorized public digital key is taken to a KSA or CA through secure mechanisms such as actual physical transport by authorized personnel or over a network secured by using encryption techniques. The resulting authorized digital key may be stored within the EPM server for inclusion into digital signatures, may be embedded into the verifier application residing on the data processing machine responsible digital signature authentication, or may be placed on a physical medium and kept by the user at recipient 130.

EPM server 210 supports a configuration manager GUI 665 that allows EPM server 210 system parameters to be set at the time of initialization and setup. This GUI may also be used to thereafter to update the configuration parameters of an operational EPM server. These system parameters are changed by accessing values stored in system registry 660.

Figure 7:
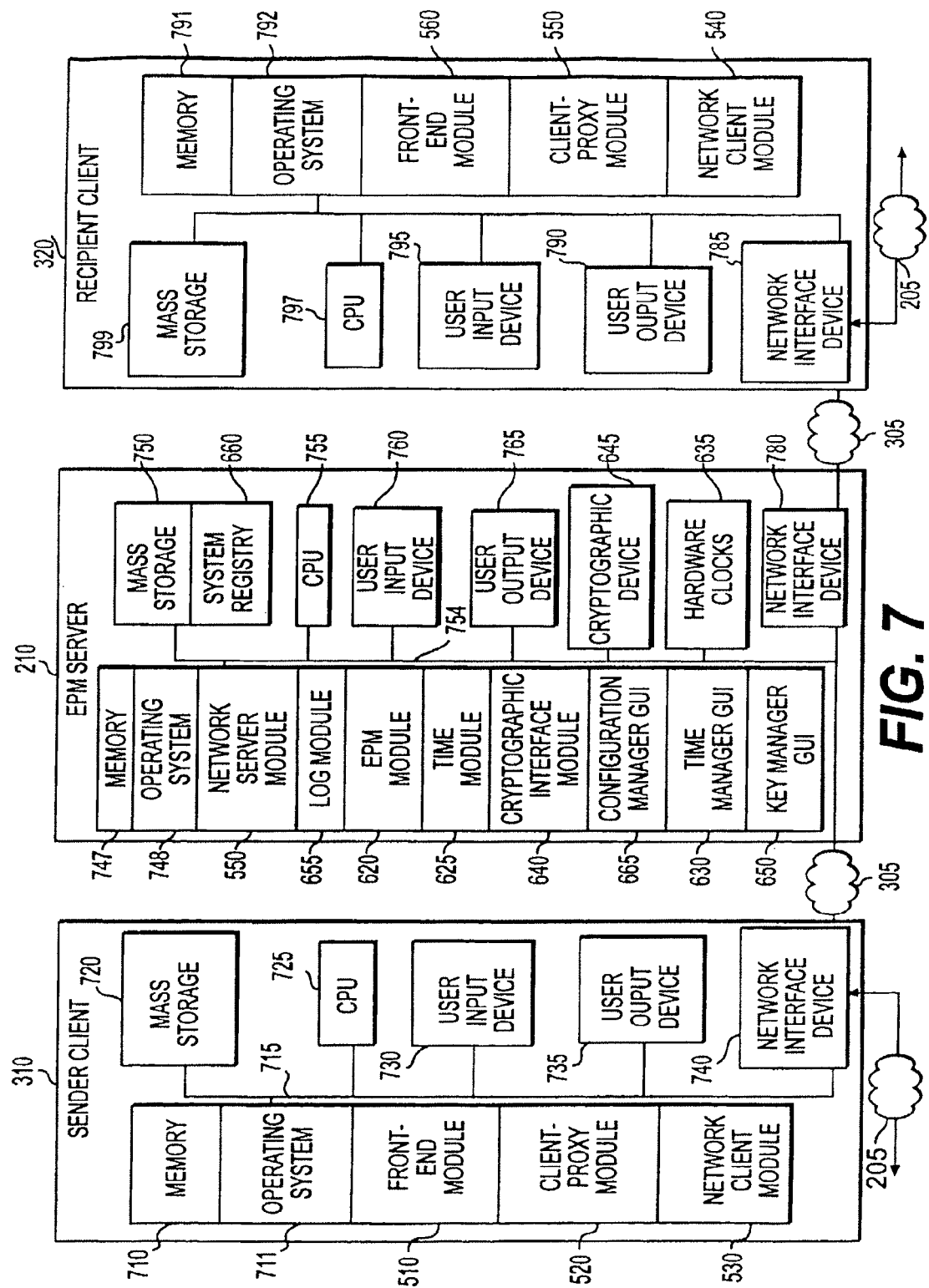
FIG. 7 is a detailed block diagram showing the hardware components corresponding to the embodiment of a FIG. 3A.

FIG. 7 is a detailed block diagram showing the components corresponding to sender client 310, EPM server 210, and recipient client 320. Sender client 310 contains a solid-state memory 710 which holds instructions which are transferred over a bus 715 for execution by a CPU 725. Memory 710 contains an operating system 711, such as, for example, Windows NT 4.0 Workstation or Unix clients. Also included in memory 710 are front-end module 510, client-proxy module 520, and network client module 530. Instructions of these modules are also contained in mass storage device 720, and are loaded into memory 710 in whole or in part during initialization of sender client 310. Also connected to bus 715 are user input device interface 730 and user output device interface 735. Sender client 310 communicates over network 205 and secure network 305 through network device interface 740.

Recipient client 320 may have the same hardware configuration as sender client 310. Memory 791 will contain operating system 792, front-end module 560, client proxy module 550, and network client module 540. Each of the modules includes the same function as its counterpart found in memory 710 of sender client 310.

EPM server 210 contains a solid-state memory 747 which holds instructions which are transferred over a bus 754 for execution by a CPU 755. Memory 747 contains an operating system 748, such as, for example, Windows NT® 4.0 Server or Unix. Also included in memory are network server module 550, log module 655, EPM module 620, cryptographic interface module 640, configuration manager GUI 665, time manager GUI 630, and key manager GUI 650. These instructions are also contained in mass storage device 750, and are loaded into memory 710 in whole or in part during initialization of EPM server 210. Also contained in mass storage 750 is system registry 660 and log file 667. Connected to bus 715 are user input device interface 760 and user output device interface 765. Cryptographic device 645 and hardware clocks 635 are also connected to bus 754 to allow communication with appropriate software modules residing in memory 747. EPM server 210 communicates over secure network 305 through network device interface 780.

Figure 8A:
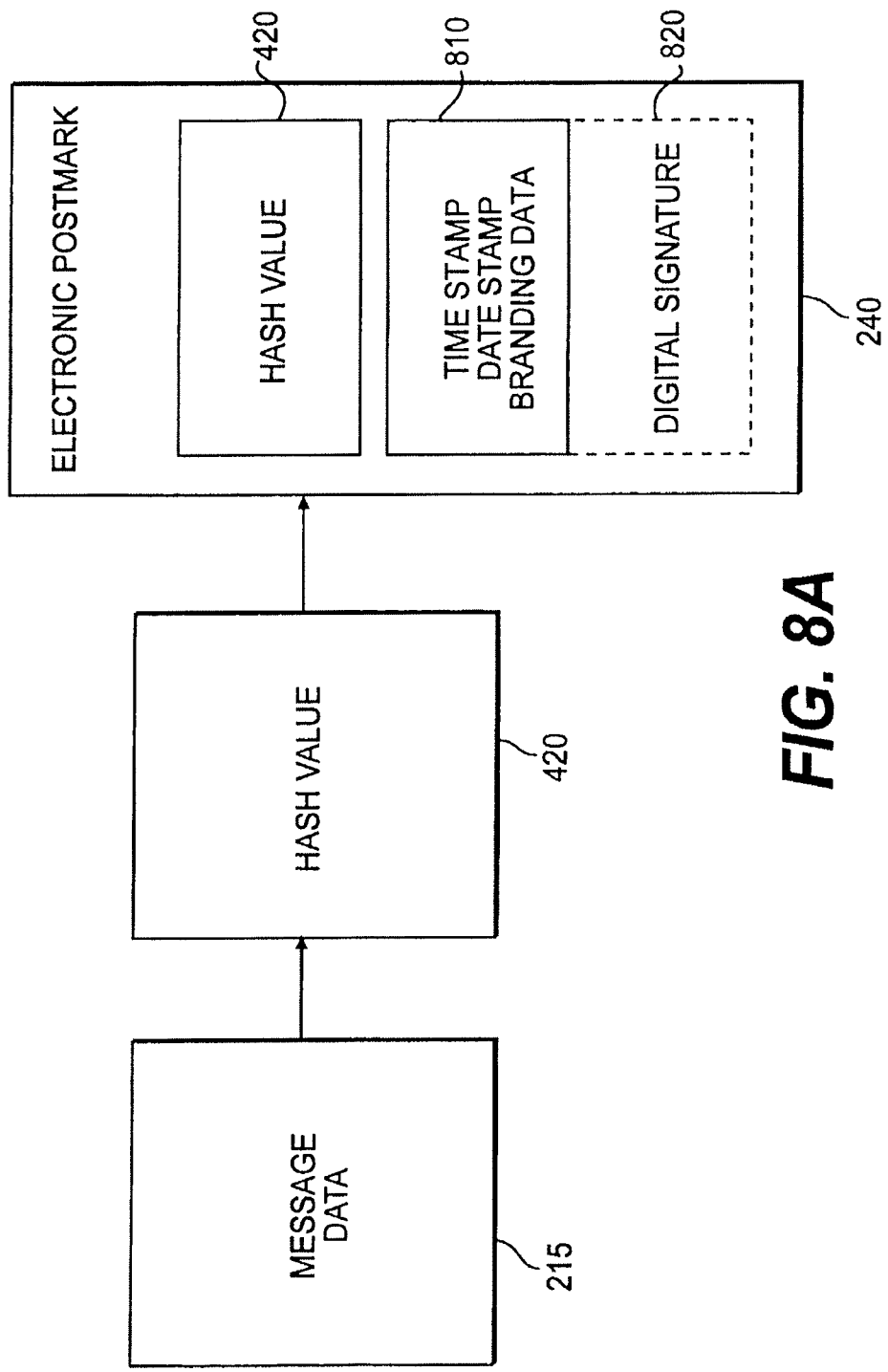
FIG. 8A is a data processing diagram corresponding to one processing mode in accordance with the present invention.

FIG. 8A illustrates the processing steps which occur to produce EPM data structure 240. A one-way hash function is performed using message data 215 to produce a digest, or hash value 420. Preferably, the one-way hash function is performed by client sender 310, but may be generated by the EPM server 210. Hash value 420 is bundled with the time and date stamp 810, obtained from time module 625. Optionally, branding information can also be included in this bundle which may present information regarding the organization offering the EPM service as described above. Furthermore, a value uniquely identifying each EPM data structure can also be included. This value can be used to facilitate account purposes. The hash value, time and date stamp, branding data, and identifier value may then "sealed" or secured through a digital signature.

As known to those skilled in the art, digital signature 820 may be produced by first performing a secure hash algorithm by using, for example, the Secure Hash Standard FIPS 180-1 on the data to be signed to produce a secure hash value. The secure hash value is then processed using a digital signature algorithm (DSA) and a unique private key to produce two data values. These data values comprise digital signature 820, which is appended to the hash value, time and data stamp, and branding data to form EPM data structure 240.

In order to validate the digital signature, a public digital key, which has a unique pairing with the private key, must be used. Methods known to those skilled in the art, such as, for example, the Digital Signature Standard, may be used to produce digital signature 820.

Figure 8B:
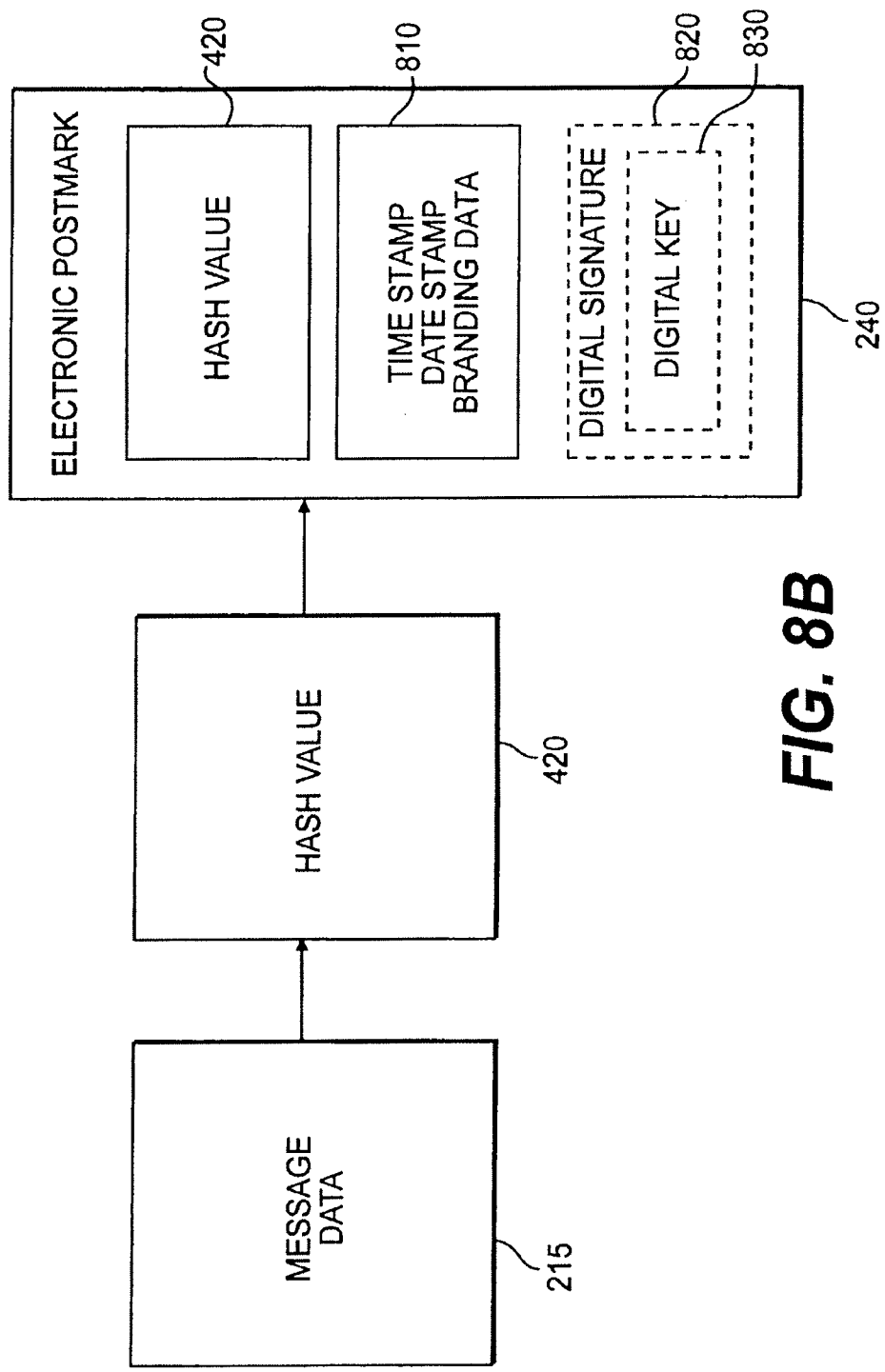
FIG. 8B is data processing diagram corresponding to another processing mode in accordance with the present invention.

FIG. 8B shows an alternate method of forming EPM data structure 240. The process is similar to that described above for FIG. 8A. However, in the method of FIG. 8A, an embedded authorized public digital key 830 is included with the digital signature 820. This method has the advantage of not requiring a key at recipient 130 in order to authenticate digital signature 820. However, to maintain the security of EPM system 120, embedded digital key 830 should only be used on a one-time basis, i.e., embedded digital key 830 should only be able to authenticate the digital signature for the single electronic message EPM data structure 240 is associated with. Additional messages sent to the same recipient 130 would include a unique embedded authorized digital key for each EPM data structure 240 sent.

The foregoing description is presented for purposes of illustration and explanation. It is not intended to be exhaustive or to limit the invention to the precise form disclosed, and modifications of variations are possible in light of the above teachings or may be acquired from practice of the invention. The principles of the invention and its practical application enable one skilled in the art to utilize the invention in various embodiments and with various modifications as are suited to the particular use contemplated.

What is claimed is:

1. A computer-implemented method for authenticating an electronic message, comprising:
    receiving, by an authentication server and from a sender client, an electronic message generated automatically by the sender client and transmitted at a predefined time, wherein the electronic message includes message data and a recipient address;
    receiving, by the authentication server at a predefined time and from the sender client, a request to authenticate the electronic message and a hash value derived from the message data;
    generating an electronic postmark data structure, the electronic postmark data structure comprising at least one of:
        the hash value;
        time and date information;
        branding data from a system registry; and
        a digital signature generated for the electronic postmark data structure;
    storing a copy of the electronic postmark data structure in a log file; and
    sending, from the authentication server, the electronic postmark data structure first to a recipient client associated with the recipient address.

2. The method of claim 1, further comprising:
    generating an authorized digital key for the electronic postmark data structure, wherein the recipient can use the authorized digital key to verify the electronic postmark data structure; and
    sending the digital key to the recipient client.

3. The method of claim 1, further comprising:
    generating a public digital key for the recipient; and
    exporting the public digital key to a key authenticator.

4. The method of claim 3 wherein exporting the public digital key to a key authenticator includes using a key authenticator which is one of a key signing authority or a certificate authority.

5. The method of claim 1, further comprising the step of: receiving updates to the time and date information.

6. The method of claim 1, wherein the branding data is from a system registry of an operating system.

7. The method of claim 1, further comprising:
    interfacing with the system registry via a configuration manager graphical user interface.

8. The method of claim 1, wherein receiving a request to authenticate the electronic message includes receiving the electronic message.

9. The method of claim 1, wherein sending the electronic postmark data structure to the recipient client includes sending the electronic message.

10. The method of claim 1, further comprising:
    creating a digest of the log file.

11. A system for authenticating an electronic message, comprising:
    a sender client that automatically generates and transmits an electronic message at a predefined time, wherein the electronic message includes message data and a recipient address;
    an authentication server including:
        a receiver that receives, at a predefined time and from the sender client, a request to authenticate the electronic message and a hash value;
        a temporal component that obtains time and date information;
        a branding component that receives branding data from a system registry;
        a signature component that generates a digital signature;
        a generating component that generates an electronic postmark data structure comprising at least one of:
            the hash value;
            time and date information;
            branding data from a system registry; and
            a digital signature generated for the electronic postmark data structure;
        a database that stores a copy of the electronic postmark data structure in a log file; and
        a sending component that sends the electronic postmark data structure to a recipient client, wherein the recipient client is configured to send the electronic postmark data structure to a recipient.

12. The system of claim 11, further comprising:
    a key generating component that generates an authorized digital key for the electronic postmark data structure, wherein the recipient can use the authorized digital key to verify the electronic postmark data structure, and wherein the sending component sends the digital key to the recipient client.

13. The system of claim 11, further comprising:
    a public key generating component that generates a public digital key for the recipient; and
    an exporting component that exports the public digital key to a key authenticator.

14. The system of claim 13, wherein the exporting component exports the public digital key to a key authenticator which is one of a key signing authority or a certificate authority.

15. The system of claim 11, wherein the temporal component receives updates to the time and date information.

16. The system of claim 11, wherein the branding data is from a system registry of an operating system.

17. The system of claim 11, further comprising:
    an interfacing component that interfaces with the system registry via a configuration manager graphical user interface.

18. The system of claim 11, wherein the receiver receives the electronic message.

19. The system of claim 11, wherein the sending component sends the electronic message to the recipient client.

20. The system of claim 11, further comprising:
    a digest component that creates a digest of the log file.

* * * * *